July 9, 1968            E. SPITZ            3,392,393
ELECTRICALLY CONTROLLED SCANNING ANTENNAS HAVING A PLURALITY
OF WAVE DIFFRACTING ELEMENTS FOR VARYING
THE PHASE SHIFT OF A GENERATED WAVE
Filed May 1, 1963                                         4 Sheets-Sheet 1
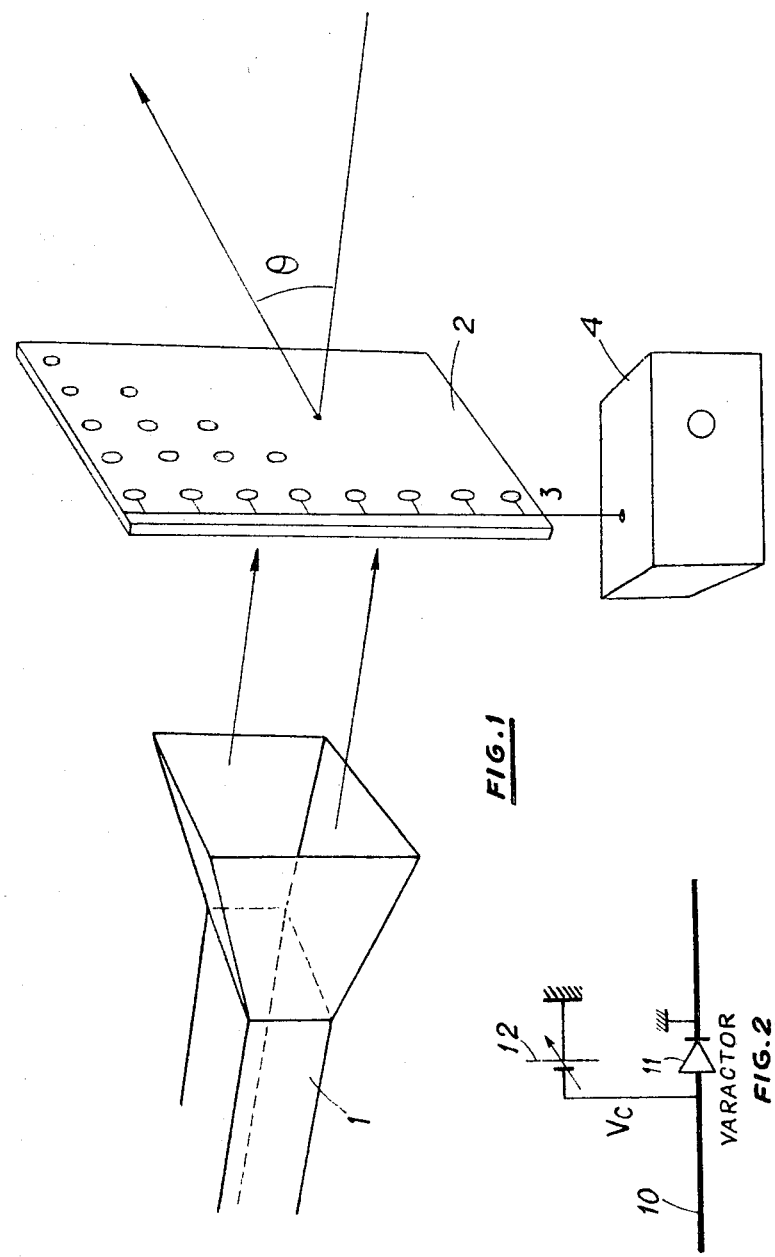

United States Patent Office 3,392,393
Patented July 9, 1968

3,392,393
ELECTRICALLY CONTROLLED SCANNING ANTENNAS HAVING A PLURALITY OF WAVE DIFFRACTING ELEMENTS FOR VARYING THE PHASE SHIFT OF A GENERATED WAVE
Erich Spitz, Paris, France, assignor to CSF—Compagnie Generale de Telegraphie Sans Fil, a corporation of France
Filed May 1, 1963, Ser. No. 277,344
Claims priority, application France, May 3, 1962, 896,283
8 Claims. (Cl. 343—754)

The present invention relates to electrically controlled antennas.

Antennas comprising diffracting elements and presenting a predetermined maximum radiation direction are known in the art. They comprise, for example a succession of metal plates, suitably spaced apart and formed with perforations, the diameter of which is smaller than the operating wavelength.

Such antennas may be used for scanning the space, but to this end, the operating wavelength has to be varied.

It is an object of the invention to provide an antenna avoiding this drawback. To this end, the invention provides an antenna wherein the scanning may be effected by varying a D.C. control current.

A scanning antenna according to the invention mentioned comprises a plurality of diffraction elements, arranged in rows and columns, each one of said elements being associated with adjusting, electrical current controlled means which causes the phases of the diffracted wave to be varied.

Consequently, an incident, plane wave, the plane of which has a fixed direction, for example a direction parallel, to the plane comprising the diffracting elements, has its direction thus modified by an adjustable angle.

The invention will be best understood from the following description and appended drawings, wherein:

FIGURE 1 is a diagrammatic perspective view showing the principle of the invention;

FIGURES 2 and 3 show radiating elements which may be used in an antenna arrangement according to the invention;

Figure 3:
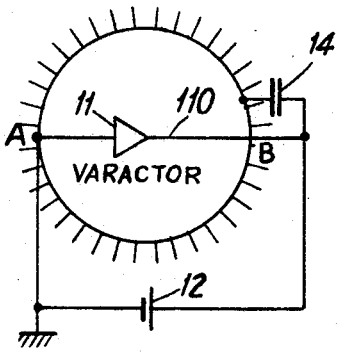

In FIG. 1, there is shown a horn 1, which radiates a plane wave normal to a support 2, which may be, for example, a plate or a frame, having diffracting elements, arranged in rows and column and the nature of which will be described later in this specification. Support 2 has a control input 3, connected to all the diffracting elements. The control input is connected to a control device 4, which provides a control D.C. current.

By the operation of the control device 4, the phase of the wave radiated by the elements of a column numbered $j$ is made equal to $j\varphi$, $\varphi$ being the phase of the wave radiated by the elements of the first lateral column.

It follows that the wave radiated by the assembly forms an angle $\theta$ with the incident wave. Thus, a scanning is obtained, for example in the vertical plane.

FIGURE 2 represents an embodiment of an adjustable diffracting element as may be used in the system of FIGURE 1, support 2 being in this case a frame. It is built up by an electrical dipole including a metal wire 10, having a length close to the wavelength in the free space of the ultra-high frequency energy to be transmitted. In the center of this wire is a semiconductor diode 11. This diode is biased by means of a source 12, of a voltage Vc, in the reverse direction. The wire portion connected to the anode of diode 11 serves as a control input of voltage Vc and the portion thereof connected to the cathode is grounded in so far as D.C. current is concerned.

Dipole 10 is excited by a wave, the direction of propagation of which is normal to the plane of the figure. As is known, the variation of voltage Vc causes the phase of the diffracted wave to be varied.

FIGURE 3 is another embodiment of the diffracting element which may be used in the arrangement of FIG. 1, support 2 being in this case a plate. This element is formed by a metal strip, provided with a hole, the diameter AB of which has a length of the order of the wavelength. With a view to adjusting the phase of the diffracted wave, a diode 11 is located in the hole and is connected to the metal by means of a conductor 10 extending along the diameter AB of the hole. The terminal A of the diode is grounded through the metal strip. The other terminal B is connected to the strip through a capacitor 14, which isolates the diode from the metal in so far as D.C. current is concerned. The capacitance C of the capacitor 14 is fixed.

The same terminal B is connected to a D.C. source 12 which biases the diode in the reverse direction. The wave is propagated, as in the previous case, normally to the plane of the figure.

Figure 4:
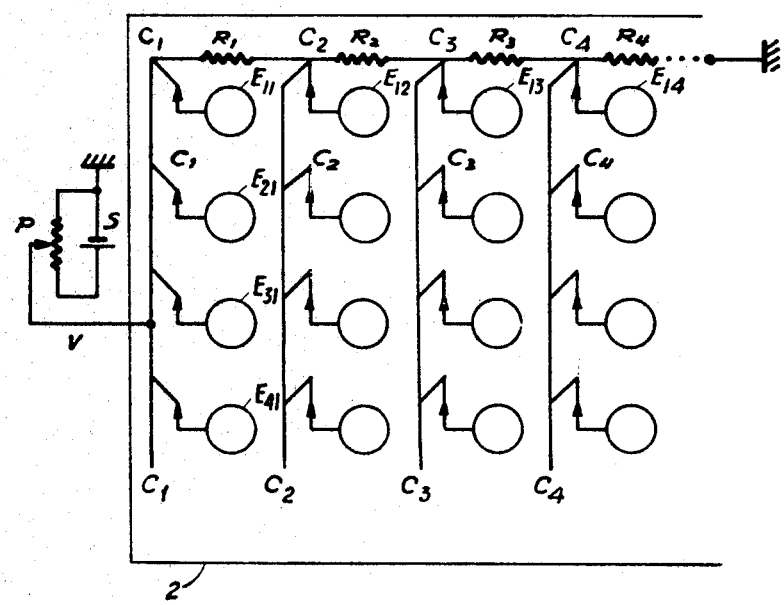
FIGURE 4 shows an embodiment of the invention given by way of example.

FIGURE 4 shows diagrammatically an embodiment of an antenna according to the invention, capable of effecting the scanning in a given plane. This antenna includes a plate 2, with radiating holes arranged in rows and columns:

$$E_{11}, E_{12} \ldots E_{n1}$$
$$E_{21}, E_{22} \ldots E_{n2}$$
$$\ldots \ldots \ldots$$

The radiating holes are of the type described with reference to FIGURE 3. The control inputs of the radiating elements of the same column are short-circuited and have a common point $C_1$ to $C_n$.

Input $C_1$ is connected to the movable tapping P of a potentiometer circuit, which is fed by a voltage supply S. Inputs $C_2$, $C_3$ are fed through resistance $R_1 \ldots R_n$, connected in series to the tapping P. Thus, input $C_3$ is fed through resistors $R_1$ and $R_2$, input $C_p$ through resistors $R_1$ to $R_{p-1}$.

Resistances R are equal and small with respect to the common impedance of the control diodes.

The operation of the system is as follows:

(a) The control voltage Vc is zero. All diffracting elements are identical and, when excited in phase by a plane wave propagating normally to the plane of the figure, the assembly of the radiating elements has its direction of maximum radiation along the normal to the plane of the figure.

(b) Voltage Vc is different from zero. The first column of radiating elements $E_{11}$ to $E_{n1}$ is fed by voltage Vc, the second by voltage $V-Ri$, the $p^{th}$ column being fed by a voltage $V-pRi$. Since the phase of the radiated wave is a linear function of the control voltage, it follows, if the phase of the wave energy radiated by the elements of the first column is $\varphi$, that the phase of the energy radiated by the second column is $2\varphi$ and that radiated by the elements of the $p^{th}$ column is $p\varphi$. Everything happens as though all the holes of a same row were fed by a wave-guide, extending along this row and wherein the wave propagates in the direction of the arrow with a phase velocity equal to $$V = \frac{\omega}{\varphi} \cdot r$$

where $r$ is the distance between two adjacent elements and $\omega$ the angular frequency. The assembly radiates then in a direction situated in a plane normal to the figure and parallel to the rows of radiating elements, i.e. in a direction given by cos $$\theta = \frac{c}{V}$$

where $c$ is the velocity of light in free space.

Figure 5:
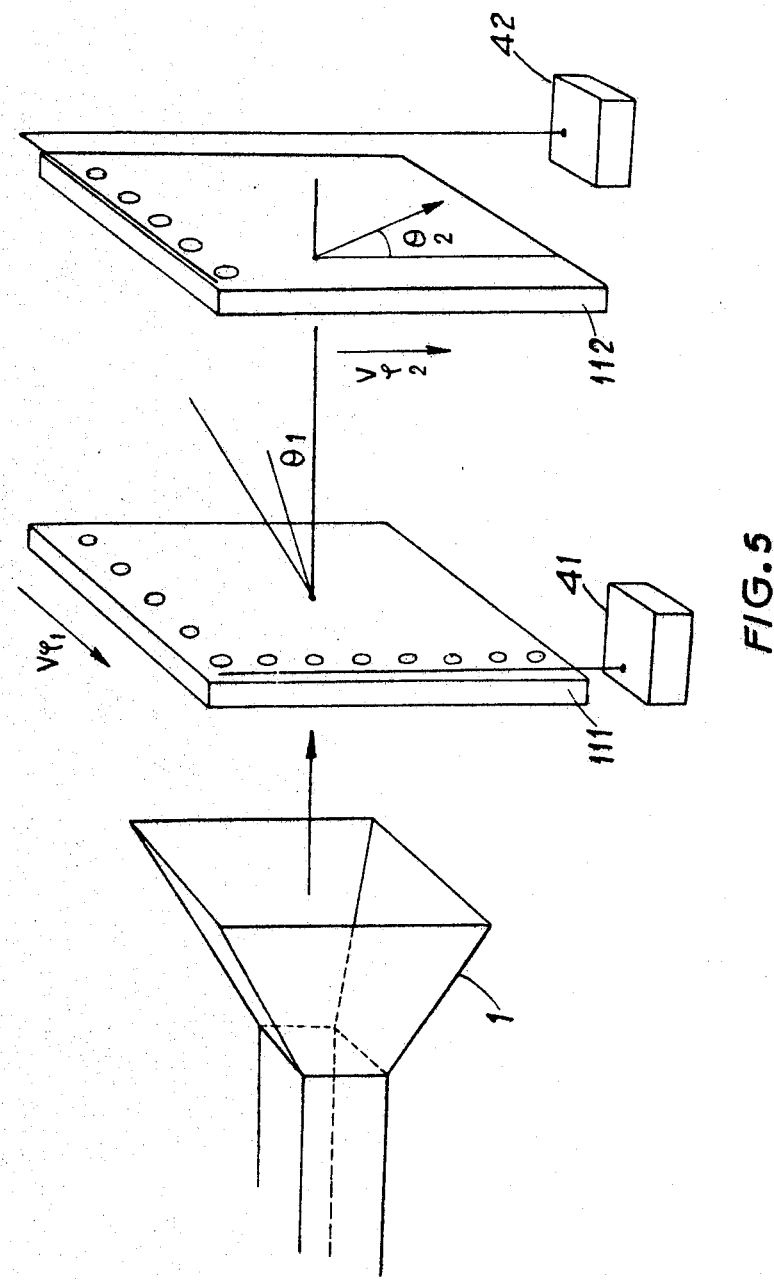
FIGURE 5 is a perspective view of still another embodiment of the invention.

FIGURE 5 shows an embodiment of a system according to the invention adapted for varying the radiating direction, both in a plane parallel to the rows of holes, and in plane parallel to the columns of holes.

Two phase velocities exist then, respectively along the rows and the columns. Their variation results in the desired scanning.

The system includes a horn 1, as in FIGURE 1 and, in addition, two plates 111 and 112, identical to that shown in FIGURE 4. However the phase is varied in plate 111 only along the columns and in plate 112 only along the rows by means of control devices 41 and 42.

Thus, there are two apparent phase velocities $V_{\phi 1}$ and $V_{\phi 2}$ and they are respectively directed along the arrows of FIGURE 5. Plate 111 performs a scanning in the horizontal plane and plate 112 performs a scanning in the vertical plane. The distance between plates 111 and 112 is adjusted by cut and trial so as to reduce the influence of the reflected waves.

The system of FIG. 5 presents a double advantage:

(a) The number of resistances is reduced to $2n$ instead of the $n^2$ resistances in the case of a single plate;

(b) The phase-shifts produced are increased due to the use of a plurality of plates, since it is known that the phase-shifts produced by several obstacles add together when the planes of the obstacles are selected so as to avoid energy reflection.

Under these conditions, in order to obtain the scanning of a substantial space portion, two groups of plates may be used:

(a) Identical vertical plates in sufficient number to obtain the horizontal scanning of a substantial space portion;

(b) Identical vertical plates in sufficient number for obtaining a vertical scanning of a substantial space portion.

The spacing between the plates is adjusted so as to reduce the stationary waves to a minimum and increase the pass-band.

Figure 6:
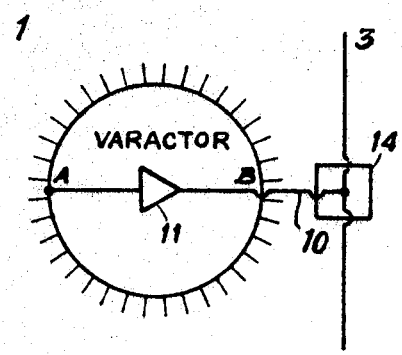
FIGURE 6 is another embodiment of the device shown in FIGURE 2.

FIGURE 6 illustrates another example of a radiating element. Capacitor 14 comprises a mica plate disposed on one face of plate 1, which forms one of its plates, the other capacitor-plate being built up by a metallized surface deposited on said mica plate. The wire 10 shown in FIGURE 3 and the control input 3 shown in FIGURE 1 are welded to this metallized surface.

By conveniently selecting the thickness of the mica plate, the coupling conditions between the diode and the hole may be adjusted.

A strong coupling provides a substantial phase-shift, but may introduce stationary waves. A weak coupling avoids such stationary waves.

Figure 7:
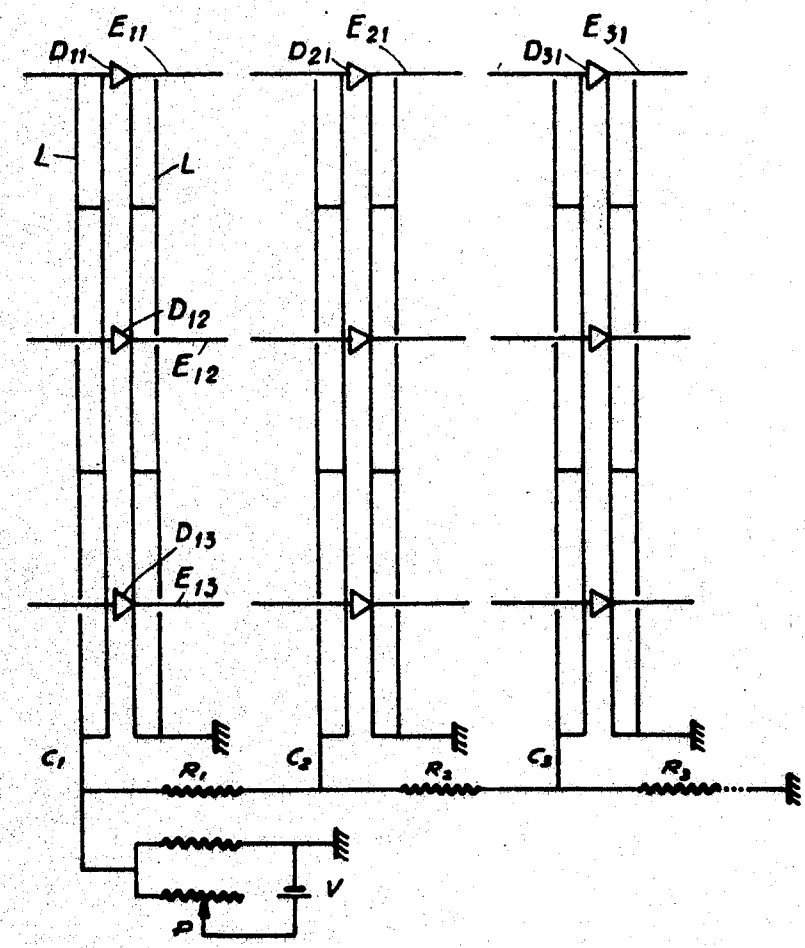
FIGURE 7 is a plan view of an alternative embodiment of the invention.

FIG. 7 is a frame which may be used in the arrangement according to the invention, when the diffracting elements are electrical dipoles as shown in FIG. 2.

Dipoles $E_{ij}$ are identical to dipole 10 in FIGURE 2, and are arranged in rows and columns. They comprise diodes $D_{ij}$, one of the terminals of which is grounded.

The control inputs $C_1$, $C_2$ are connected to a potentionmeter P, by means of resistances $R_1 \ldots R_p$. Quarter-wave lines L decouple the dipoles from each other thus avoiding that the ultra-high frequency energy propagation in the biasing lines adapted to conduct the D.C. control current. Lines L are formed by two conductors extending parallel and on each side of the biasing lines connecting the diodes to each other.

The antennas according to the invention have the following advantages:

(a) Very high scanning velocities may be achieved, either in a circular, or in a television-type scanning.

(b) Any scanning program may be achieved, provided resistances $R_1$, $R_2$ ... etc., which define the control voltages, are adjustable or fixed by means of a suitable computer.

The very high value of the impedances of the diodes biased in the reverse direction avoids errors and facilitates the circuit arrangement.

This feature is extremely advantageous in the field of missile or satellite tracking.

(c) The energy necessary for performing the scanning remains extremely low, since the variable impedance of the diode is obtained when the resistance thereof is nearly infinite.

(d) The assembly is planar and the structure periodical, which facilitates the manufacture and adjustment.

(e) The antenna is extremely economical.

(f) The antenna is light and does not include magnets as the scanning antennas including ferrites. The antenna is extremely reliable, since the same tracking angles correspond to the same voltages. It does not give rise to hysteresis as do the antennas of the ferrite type, which require a complete cycle of the voltage variation to be achieved before the desired tracking angle may be repeated. This feature is highly advantageous in all applications involving target tracking, wherein the tracking angle variations do not follow a regular cycle.

What is claimed is:

1. An antenna for ultrashort waves comprising: means for generating a plane wave; at least one support carrying a plurality of wave diffracting elements, arranged in a plurality of alignments along two different directions parallel to said wave, each of said elements including electrical means for varying the phase shift impressed thereby on said wave propagating towards said elements and diffracted thereby and means for controlling said varying means to provide phase-shifts differing from one alignment to the other along at least one of said directions.

2. An antenna for ultrashort waves comprising: means for generating a plane wave; at least one support carrying a plurality of wave diffracting elements, arranged in a plurality of alignments along two different directions parallel to said wave, each of said elements including electrical means for varying the phase shift impressed thereby on said wave propagating towards said elements and diffracted thereby.

3. An antenna for ultrashort waves comprising: means for generating a plane wave; at least one conductor plate having holes for diffracting said wave arranged in a plurality of alignments along two different directions parallel to said wave; phase shifting diodes, having two terminals, respectively positioned within said holes, one of said terminals being grounded; capacitors respectively connecting the other terminals to said plate; and means for applying to said diodes in the reverse direction variable biasing voltages to provide phase shifts differing from one alignment to the other along at least one of said directions.

4. An antenna for ultrashort waves comprising: means for genearting a plane wave; at least one conductor plate parallel to said wave having holes for diffracting said wave, arranged in a plurality of alignments along two different directions crossing each other; phase shifting diodes having two terminals, respectively positioned in said holes, one of said terminals being grounded; capacitors respectively connecting said other terminals to said plate, and potentiometer means for applying to said diodes of said alignments a variable biasing voltage in the reverse direction and resistor means for controlling said diodes to provide phase shifts differing from one alignment to the other along at least one of said directions.

5. An antenna for ultrashort wave comprising: means for generating a plane wave; at least one first support carrying a plurality of diffracting elements arranged in columns along a first direction; at least one second support carrying a plurality of diffracting second elements arranged in rows along a second direction crossing said first direction; said directions of said rows and of said columns being parallel to said plane wave; each of said elements including electrical means for varying the phase shift impressed thereby on said wave propagating towards said elements and diffracted thereby and means for making this phase shift different along said first and second direction respectively, said first and second supports being in spaced apart and parallel relationship with respect to each other.

6. An antenna for ultrashort waves comprising: means for generating a plane wave; at least one arrangement of diffracting dipole alignments along two different directions parallel to said wave, each of said dipoles including a phase-shifting diode having two terminals, one of said terminals being grounded, and means for applying to said diodes variable biasing voltages to provide phase shifts differing from one alignment to the other along at least one of said directions.

7. An antenna for ultrashort waves comprising: means for generating a plane wave, at least a first and a second plane supports parallel to said wave, said supports carrying respectively rows of diffracting dipoles the direction of the rows in said first support crossing the direction of the rows in said second support, each of said dipoles comprising a diode having two electrodes and a first and a second wire respectively connected to said two electrodes, said first wire being grounded; and in each support said second wires of said dipoles of each row being parallel connected: a potentiometer device for applying an adjustable voltage to said second wires of the first row, resistances of equal value respectively connecting said second wires of each row to the second wires of the adjacent row, said resistances forming a bridge between said potentiometer and ground; and in each row, wave traps between said dipoles for decoupling them from each other.

8. An antenna for ultrashort waves comprising: means for generating a plane wave; at least one conductor plate having holes for diffracting said wave arranged in alignments along two different directions parallel to said wave; diodes, having two terminals, respectively positioned in said holes one of said terminals being grounded; respective capacitors connecting said other terminals to said plate; said diodes having respective bias control inputs, resistors interconnecting the control input, of the adjacent diodes; and potentiometer means for applying a variable biasing voltage to said control inputs through said resistors.

References Cited

UNITED STATES PATENTS

| | | | |
|---|---|---|---|
| 2,986,734 | 5/1961 | Jones, et al. | 343—754 |
| 3,041,605 | 6/1962 | Goodwin, et al. | 343—854 X |
| 3,175,218 | 3/1965 | Goebels | 343—768 |

HERMAN KARL SAALBACH, *Primary Examiner.*

PAUL L. GENSLER, *Examiner.*